United States Patent
Viswanathan et al.

(10) Patent No.: US 10,289,797 B1
(45) Date of Patent: May 14, 2019

(54) LOCAL CLUSTER REFINEMENT

(71) Applicant: Cadence Design Systems, Inc., San Jose, CA (US)

(72) Inventors: Natarajan Viswanathan, Austin, TX (US); Charles Jay Alpert, Cedar Park, TX (US); Wen-Hao Liu, Cedar Park, TX (US); Thomas Andrew Newton, Great Cambourne (GB)

(73) Assignee: Cadence Design Systems, Inc., San Jose, CA (US)

( * ) Notice: Subject to any disclaimer, the term of this patent is extended or adjusted under 35 U.S.C. 154(b) by 4 days.

(21) Appl. No.: 15/688,735

(22) Filed: Aug. 28, 2017

(51) Int. Cl.
  *G06F 17/50* (2006.01)

(52) U.S. Cl.
  CPC ...... *G06F 17/5081* (2013.01); *G06F 17/5072* (2013.01); *G06F 17/5077* (2013.01); *G06F 2217/84* (2013.01)

(58) Field of Classification Search
  CPC ............. G06F 17/5054; G06F 17/5072; G06F 2217/78; G06F 2217/62; G06F 17/5081; G06F 17/5077; G06F 2217/84
  See application file for complete search history.

(56) References Cited

U.S. PATENT DOCUMENTS

| | | | | |
|---|---|---|---|---|
| 6,440,780 B1* | 8/2002 | Kimura | ................. | G06F 17/505 438/129 |
| 6,698,006 B1* | 2/2004 | Srinivasan | ................. | G06F 1/10 716/114 |
| 7,467,367 B1* | 12/2008 | Li | ................. | G06F 17/505 716/103 |
| 7,549,137 B2* | 6/2009 | Alpert | ................. | G06F 17/5072 716/114 |
| 8,484,604 B2* | 7/2013 | Jiang | ................. | G06F 17/5031 716/134 |
| 8,635,579 B1* | 1/2014 | Cao | ................. | G06F 17/5045 716/105 |
| 8,677,299 B1* | 3/2014 | Alpert | ................. | G06F 17/5054 716/118 |
| 8,887,117 B1* | 11/2014 | Chuang | ................. | G06F 17/5077 716/124 |
| 8,966,425 B1* | 2/2015 | Eisenstadt | ................. | G06F 17/5077 716/120 |
| 9,310,831 B2* | 4/2016 | Sunder | ................. | G06F 1/10 |
| 9,495,501 B1* | 11/2016 | Kim | ................. | G06F 17/5072 |
| 10,073,944 B2* | 9/2018 | Rajaram | ................. | G06F 17/5081 |
| 2003/0135836 A1* | 7/2003 | Chang | ................. | G06F 17/5045 716/119 |
| 2004/0196081 A1* | 10/2004 | Srinivasan | ................. | G06F 1/10 327/165 |

(Continued)

*Primary Examiner* — Nha T Nguyen
(74) *Attorney, Agent, or Firm* — Schwegman Lundberg & Woessner, P.A.

(57) ABSTRACT

Aspects of the present disclosure address improved systems and methods for local cluster refinement during clock tree synthesis for integrated circuit designs. In accordance with some embodiments, the methods for local cluster refinement may include pin move refinement and local reclustering. With pin move refinement, pins are moved from clusters that fail to satisfy design rule constraints to nearby clusters that satisfy design rule constraints. With local reclustering, groups of neighboring clusters that fail or nearly fail to satisfy design rule constraints are dissolved and corresponding pins are regrouped to form new clusters that satisfy design rule constraints.

20 Claims, 9 Drawing Sheets

(56) References Cited

U.S. PATENT DOCUMENTS

| | | | | |
|---|---|---|---|---|
| 2007/0240087 A1* | 10/2007 | Ishihara | ............... | G06F 17/5045 |
| | | | | 716/113 |
| 2008/0127018 A1* | 5/2008 | Alpert | .................. | G06F 17/5072 |
| | | | | 716/122 |
| 2009/0193377 A1* | 7/2009 | Puri | .................... | G06F 17/5077 |
| | | | | 716/119 |
| 2009/0217225 A1* | 8/2009 | Sunder | ..................... | G06F 1/10 |
| | | | | 716/113 |
| 2010/0162186 A1* | 6/2010 | Shah | .................... | G06F 17/505 |
| | | | | 716/114 |
| 2012/0110532 A1* | 5/2012 | Alpert | ................. | G06F 17/5072 |
| | | | | 716/114 |
| 2012/0110538 A1* | 5/2012 | Shih | ................... | G06F 17/5077 |
| | | | | 716/129 |
| 2012/0240091 A1* | 9/2012 | Sunder | ..................... | G06F 1/10 |
| | | | | 716/113 |
| 2013/0326456 A1* | 12/2013 | Alpert | ................. | G06F 17/5077 |
| | | | | 716/122 |
| 2014/0181772 A1* | 6/2014 | Alpert | ................. | G06F 17/5077 |
| | | | | 716/114 |
| 2014/0258964 A1* | 9/2014 | Lin | ...................... | G06F 17/505 |
| | | | | 716/134 |
| 2017/0228485 A1* | 8/2017 | Xu | ..................... | G06F 17/5054 |

\* cited by examiner

LOCAL CLUSTER REFINEMENT

TECHNICAL FIELD

The present disclosure generally relates to the technical field of integrated circuit (IC) design. In particular, the present disclosure addresses systems and methods for designing a clock tree for an IC.

BACKGROUND

An integrated circuit (IC) layout specifies portions of various components of an IC. When the IC is to include a large number of registers, latches, flip-flops, and/or other types of clocked devices ("sinks") that are to be clocked by one or more clocks, the IC must include one or more clock trees for delivering the clock signal from the clock source to all of the sinks to be clocked by it. A clock tree distributes a clock signal from its root to a set of sinks within an IC through a branching network of fan-out buffers. A clock tree includes a hierarchy of fan-out buffers (which may or may not invert the clock signal) for fanning the clock tree out from one or more buffers at a top level of the hierarchy to a large number of buffers at the lowest level of the hierarchy that drive the clock inputs of the sinks.

After establishing positions of all fan-out buffers and routing signal paths between the buffers and the sinks, a clock tree synthesis (CTS) tool estimates the path delays from the clock tree root to all sinks and then inserts additional buffers into various branches of the clock tree as needed to reduce variations in path delays to the sinks, thereby balancing the clock tree. Conventional approaches to positioning fan-out buffers involve grouping sinks into a set of clusters such that each cluster has no more than the number of sinks that can be driven by a single fan-out buffer. Sinks are typically clustered using one of two approaches—a geometry-based approach and a load-based approach.

In an example of the conventional geometry-based approach to clustering, sinks are grouped into clusters such that the clusters have approximately equal spans. With this approach, a portion of the clusters may be sparsely populated with sinks while other clusters may be densely populated with sinks. The geometry-based approach may result in a large number of clusters, which may increase power consumption. Further, the geometry-based approach may be overly time consuming for designs with a large number of sinks.

In an example of the conventional load-based approach to clustering, sinks are grouped into clusters such that the clusters have approximately equal loads (e.g., total pin capacitance). However, this approach frequently results in clusters with large spans that potentially violate slew and skew constraints for the design. Further, the conventional load-based approach fails to account for loading effects of wiring.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
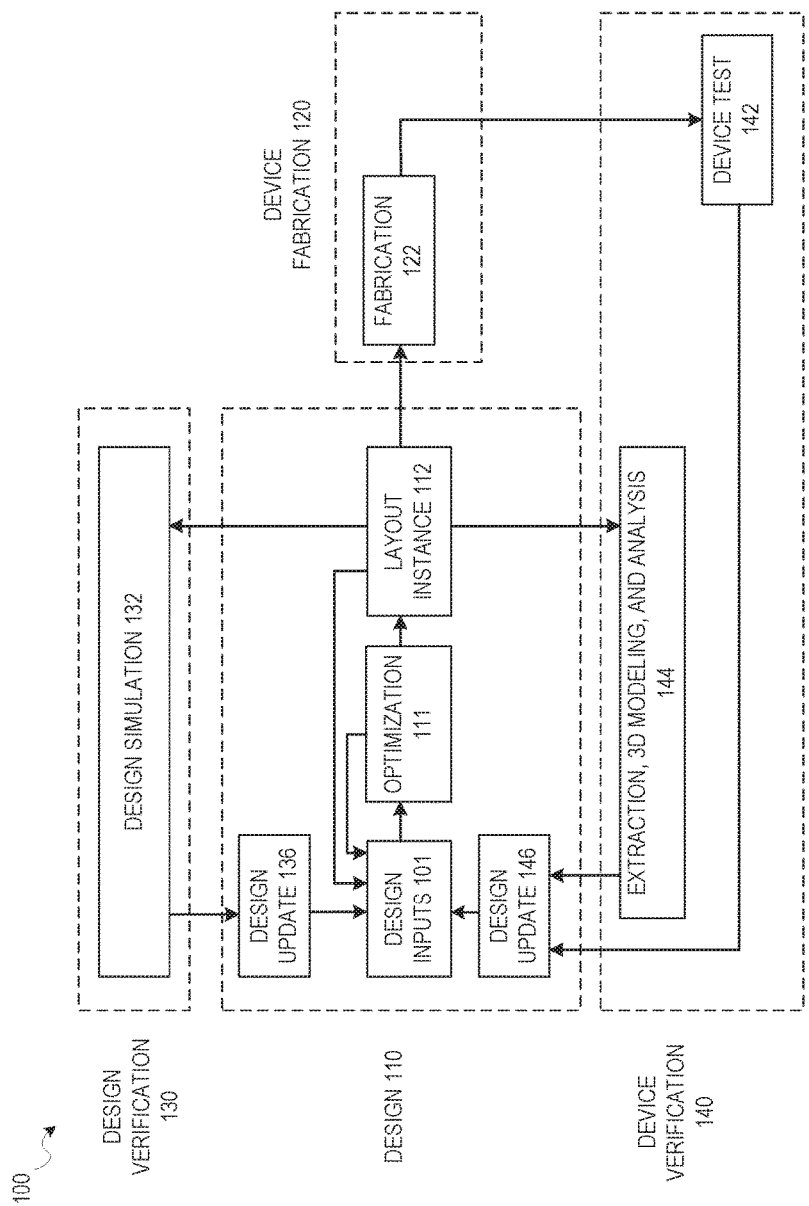
FIG. 1 is a diagram illustrating a possible design process flow which includes elements for locally refining clock tree structures, according to some example embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure include software stored on computer-readable media, which when read and executed by a machine, configures the machine to include a clock tree synthesis (CTS) tool. Consistent with some embodiments, the CTS tool performs local cluster refinements that include inter-cluster pin moves and local reclustering. Conventional techniques either explicitly split clusters that fail design rule constraints (e.g., transition, skew, and total cluster capacitance) or increase the number of clusters in performing global reclustering for the entire clustering problem instance, both of which may lead to increased clock buffer count, area, and power consumption. By locally refining clusters in the manner described herein, the CTS tool may provide an advantage over conventional techniques by improving clock buffer count, area, and power during clock tree construction.

In accordance with some embodiments, the CTS tool is configured to perform a method for pin move refinement that includes evaluating a set of clusters in accordance with design rule constraints. The design rule constraints may, for example, set forth targets for transition, skew, and total capacitance of clusters. Accordingly, in evaluating the set of clusters, the CTS tool may determine timing and loading characteristics of the clusters and compare the determined characteristics with one or more timing or loading targets. The CTS tool classifies each cluster based on a result of the evaluation. For example, the CTS tool may classify each cluster as "Failing," "Borderline Passing," or "Passing." The CTS tool moves pins from each failing cluster to nearby passing clusters to generate refined clusters that meet design rule constraints.

In accordance with some embodiments, the CTS tool is configured to perform a method for local reclustering refinement that includes evaluating a set of clusters to determine a status of each cluster with respect to design rule constraints (e.g., "Failing," "Borderline Passing," and "Passing") and identifying a failed cluster based on the evaluation. The method further includes determining nearby failing or nearly failing clusters and dissolving the failed cluster and nearby clusters, which results in a set of unclustered pins. The method further includes regrouping the unclustered pins to form a refined set of clusters that meet design rule constraints that includes at least one more cluster than before the original clusters were dissolved.

FIG. 1 is a diagram illustrating one possible design process flow which includes elements for locally refining a clock tree structure, according to some embodiments. It will be apparent that other design flow operations may function using the timing constraints and optimizations described herein, but a design flow 100 is described here for the purposes of illustration. As illustrated, the design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where a CTS tool generates initial layouts for a clock tree structure and sinks, before refinements are made to ensure that timing requirements for each sink are met. The initial layouts for the balanced clock tree structure and sinks include an initial clustering solution for grouping the sinks. The initial strategy, tactics, and context for the device to be created are also generated in the design input operation 101, depending on the particular design algorithm to be used.

In some embodiments, following an initial selection of design values in the design input operation 101, the CTS tool performs clock tree synthesis and associated timing analysis and optimization (e.g., refinements to the clock tree structure) according to various embodiments, along with any other automated design processes, at an optimization operation 111. Design rule constraints for a clock tree structure and sinks which receive a clock signal from the clock tree structure may be initiated with design inputs in the design input operation 101, and then may be analyzed using timing analysis according to various embodiments. While the design flow 100 shows such optimization occurring prior to a layout instance 112, such timing analysis and optimization may be performed at any time to verify operation of a circuit design. For example, in various embodiments, constraints for blocks in a circuit design may be generated prior to routing of connections in the circuit design, after routing, during register transfer level (RTL) operations, or as part of a final signoff optimization or verification prior to a device fabrication operation 122. Certain embodiments of operations described herein for refining a clock tree structure may therefore involve iterations of the design input operation 101, optimization operation 111, and layout instance 112 generation. In other systems, other design processes may be used.

After design inputs are used in the design input operation 101 to generate a circuit layout, and any optimization operations 111 (e.g., local refinement transforms) are performed, a layout is generated in the layout instance 112. The layout describes the physical layout dimensions of the device that match the design inputs. This layout may then be used in the device fabrication operation 122 to generate a device, or additional testing and design updates may be performed using designer inputs or automated updates based on design simulation 132 operations, or extraction, 3D modeling, and analysis 144 operations. Once the device is generated, the device can be tested as part of device test 142 operations, and layout modifications generated based on actual device performance.

As described in more detail below, design updates 136 from the design simulation 132 operations; design updates 146 from the device test 142 or extraction, 3D modeling, and analysis 144 operations; or further direct design input operations 101 may occur after an initial layout instance 112 is generated. In various embodiments, whenever design inputs are used to update or change an aspect of a circuit design, a timing analysis and an optimization operation 111 may be performed.

Figure 2:
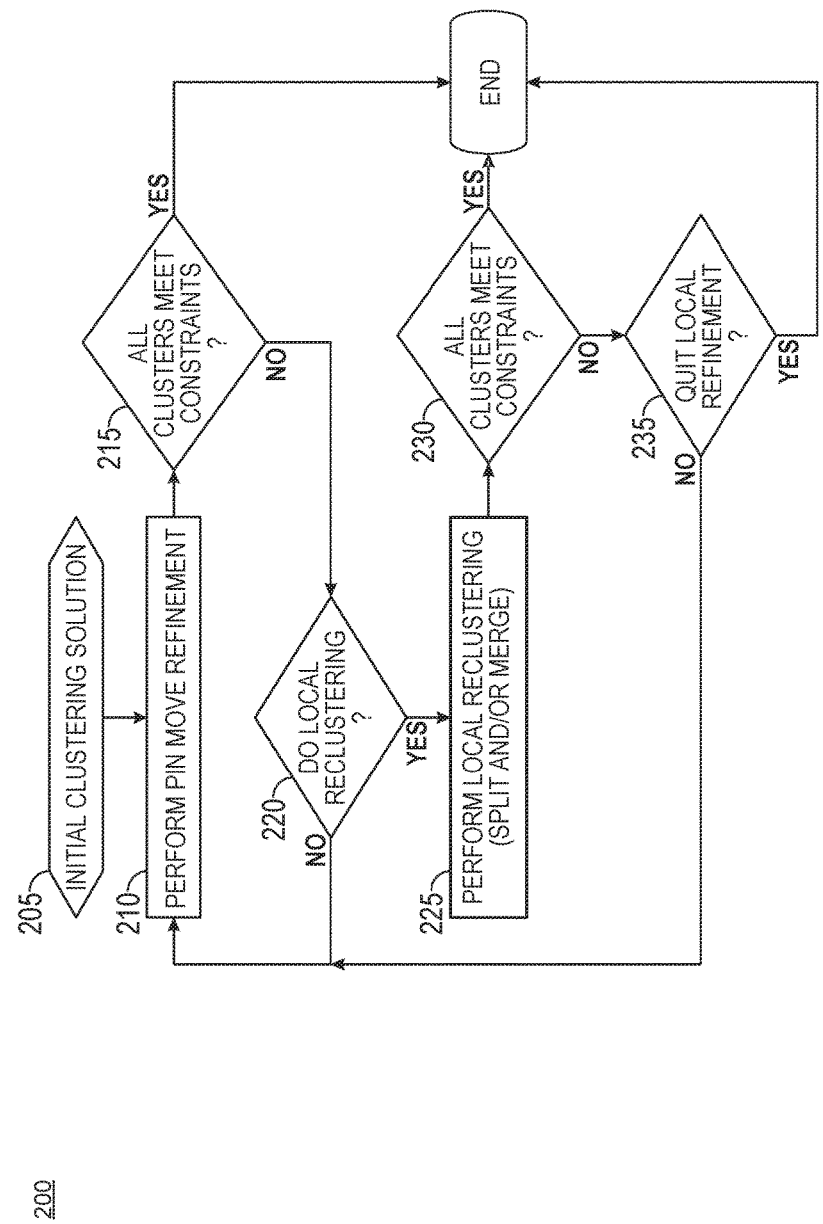
FIG. 2 is a flowchart illustrating operations of a CTS tool in performing a method for refining clusters of a clock tree structure, according to some embodiments.

FIG. 2 is a flowchart illustrating operations of a CTS tool in performing a method 200 for refining clusters of a clock tree structure, according to some embodiments. The method 200 may be embodied in computer-readable instructions for execution by one or more processors such that the operations of the method 200 may be performed in part or in whole by a computing device (e.g., a machine 700 of FIG. 7). Such an embodiment may include software executed on an electronic design automation (EDA) computing device that includes a CTS tool configured to generate and refine a clock tree structure; accordingly, the method 200 is described below by way of example with reference thereto. However, it shall be appreciated that the performance of the method 200 is not intended to be limited to such hardware configurations, and at least some of the operations of the method 200 may be deployed on various other hardware configurations. For example, some embodiments comprise a device that includes a memory with a circuit design, and processing circuitry configured into a special device to perform the operations of the method 200.

At 205, the CTS tool accesses an initial clustering solution for a clock tree structure. The initial clustering solution includes an initial set of clusters, each of which includes a group of pins. Each pin corresponds to the clock pin on a sink, which is an element (e.g., clock buffers, clock inverters, registers, latches, and flip-flops) in an IC design that receives a clock signal.

Figure 3:
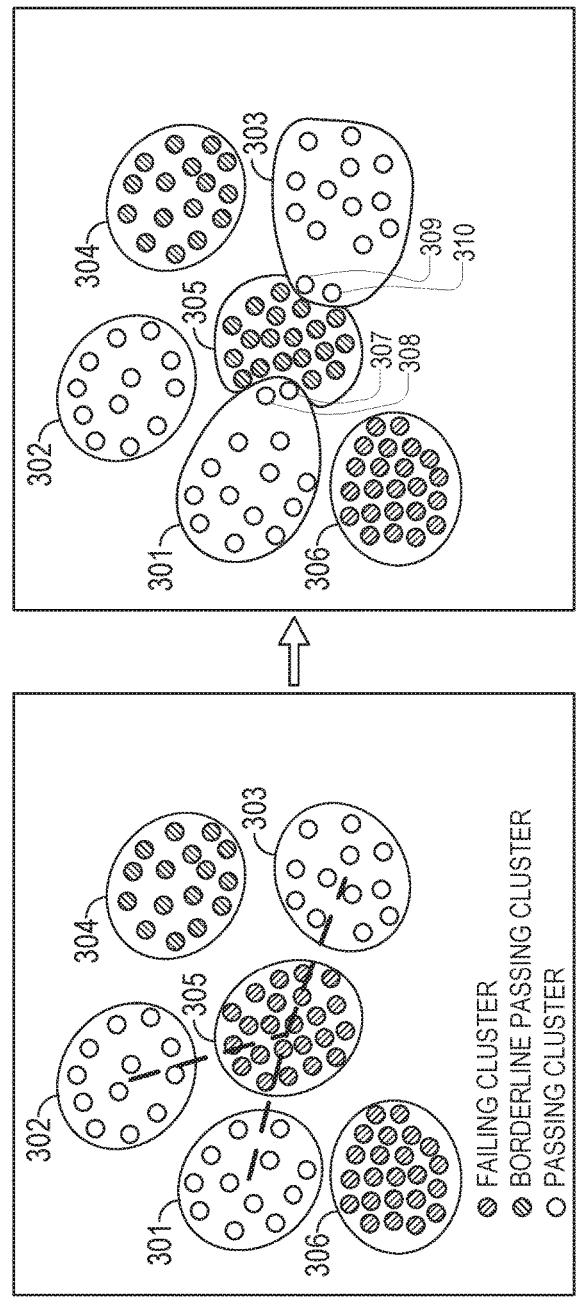
FIG. 3 is a conceptual diagram that graphically illustrates a method for pin move refinement, which may be performed as part of the method for refining clusters of a clock tree structure, according to some embodiments.

As shown, the CTS tool performs a method for pin move refinement on the initial set of clusters, at 210. The pin move refinement method involves moving pins from failing clusters to nearby passing clusters to generate a refined set of clusters with improved timing that are closer to satisfying the targets derived from design rule constraints compared to the initial set of clusters. As an example, FIG. 3 is a conceptual diagram that graphically illustrates a method for pin move refinement. As shown in FIG. 3, initial clusters 301-306 are classified by the CTS tool based on an evaluation of the clusters with respect to one or more design rule constraints (e.g., transition, skew, and total cluster capacitance targets). More specifically, the CTS tool classifies the initial clusters 301-306 according to the following classifications: "Borderline Passing" if the cluster satisfies the design rule constraints by only a predefined margin (e.g., 10% or less); "Passing" if the cluster satisfies the design rule constraints by more than the predefined margin; or "Failing" if the cluster does not satisfy the design rule constraints.

As shown, the clusters 301-303 are classified as passing, the cluster 304 is classified as borderline passing, and the clusters 305 and 306 are classified as failing. In this example, the CTS tool may select and target the cluster 305 for local pin move refinement based on the cluster 305 being a failed cluster. Accordingly, the CTS tool identifies passing clusters that neighbor the cluster 305 (e.g., nearby clusters), which in this example correspond to clusters 301-303.

As shown in FIG. 3, the CTS tool moves pins from the failing cluster 305 to the neighboring passing clusters 301 and 303 to produce refined clusters that meet design rule constraint targets. The CTS tool may iteratively move pins from the cluster 305 to the neighboring clusters until the cluster 305 meets design rule constraint targets. In this particular example, the CTS tool moves pins 307 and 308 from the failing cluster 305 to the passing cluster 301 and moves pins 309 and 310 from the failing cluster 305 to the passing cluster 303. As a result, the refined cluster 305 becomes a passing cluster (albeit borderline passing), and the refined clusters 301 and 303 remain passing clusters. Further details regarding the method of pin move refinement are discussed below in reference to FIGS. 5A and 5B.

Returning to FIG. 2, at 215, the CTS tool determines whether all clusters in the refined set of clusters meet design rule constraints (e.g., transition, skew, and total cluster capacitance). If all clusters meet the design rule constraints, the method 200 ends.

Otherwise, upon determining that at least one cluster violates the design rule constraints, the CTS tool determines, at 220, whether to perform local reclustering based on a result of the previous iteration of the pin move refinement method. For example, the CTS tool may proceed with local reclustering if a predefined number of pin move refinement iterations have been performed or if the previous iteration of pin move refinement did not result in a change to clusters. If neither of these conditions is met, the method 200 returns to 210 where the CTS tool performs another iteration of the pin move refinement method. However, if at least one of these conditions is met, the method 200 proceeds to 225 where the CTS tool performs a method for local reclustering. The method for local reclustering involves dissolving failing clusters along with their neighboring failing and borderline passing clusters, and regrouping the pins of the dissolved clusters to form a new set of clusters. The new set of clusters includes at least one additional cluster compared to the number of clusters corresponding to the failed cluster and neighboring failing and borderline passing clusters.

Figure 4:
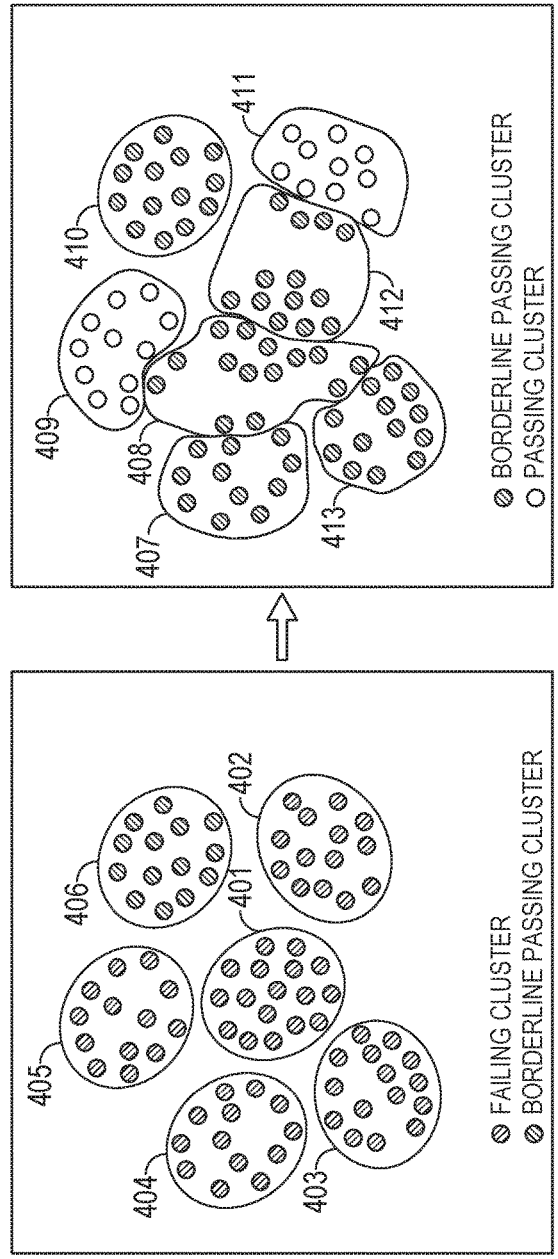
FIG. 4 is a conceptual diagram that graphically illustrates a method of local reclustering, which may be performed as part of the method for refining clusters of a clock tree structure, according to some embodiments.

As an example, FIG. 4 graphically illustrates a method of local reclustering. As shown in FIG. 4, initial clusters 401-406 are classified by the CTS tool based on an evaluation of the clusters with respect to one or more design rule constraints (e.g., transition, skew, and total cluster capacitance targets). As in the process of pin move refinement, the CTS tool classifies the initial clusters 401-406 as "passing," "borderline passing," and "failing." In this example, the clusters 401-405 are classified as failing and the cluster 406 is classified as borderline passing.

In this example, the CTS tool may select and target the cluster 401 for local reclustering based on the cluster 401 being a failing cluster. Accordingly, the CTS tool identifies clusters that neighbor the cluster 401—the clusters 402-406. In response to determining that each of the neighboring clusters 402-406 is either a failing or a borderline passing cluster, the CTS tool dissolves the target cluster 401 and the neighboring clusters 402-406, thereby resulting in a set of unclustered pins. The CTS tool regroups the unclustered pins to form a new set of clusters that includes one additional cluster and each cluster in the new set of clusters meets the design rule constraints. For example, as shown, the initial set of clusters includes six clusters (the clusters 401-406), while the new set of clusters includes seven clusters (the clusters 407-413). Further details regarding the method of local reclustering are discussed below in reference to FIGS. 6A and 6B.

Returning to FIG. 2, at 230, the CTS tool determines whether all clusters in the refined set of clusters meet design rule constraints (e.g., transition, skew, and total cluster capacitance) as a result of the local reclustering. In determining whether all clusters meet the design rule constraints, the CTS tool assesses the timing characteristics of the clusters and checks the results against timing targets imposed by the various design rule constraints. It also evaluates the clusters against other constraints that may not require assessing the timing characteristics of the clusters. If all clusters meet the design rule constraints, the method 200 ends.

Otherwise, upon determining that at least one cluster does not meet the design rule constraints, the CTS tool determines, at 235, whether to terminate local cluster refinement. For example, the CTS tool may terminate local cluster refinement if a predefined number of local cluster refinement iterations have been performed. If the predefined number of local cluster refinement iterations have been performed, the method 200 ends. Otherwise, the method 200 once again returns to 210 where the CTS tool performs another iteration of local cluster refinement.

Figure 5A:
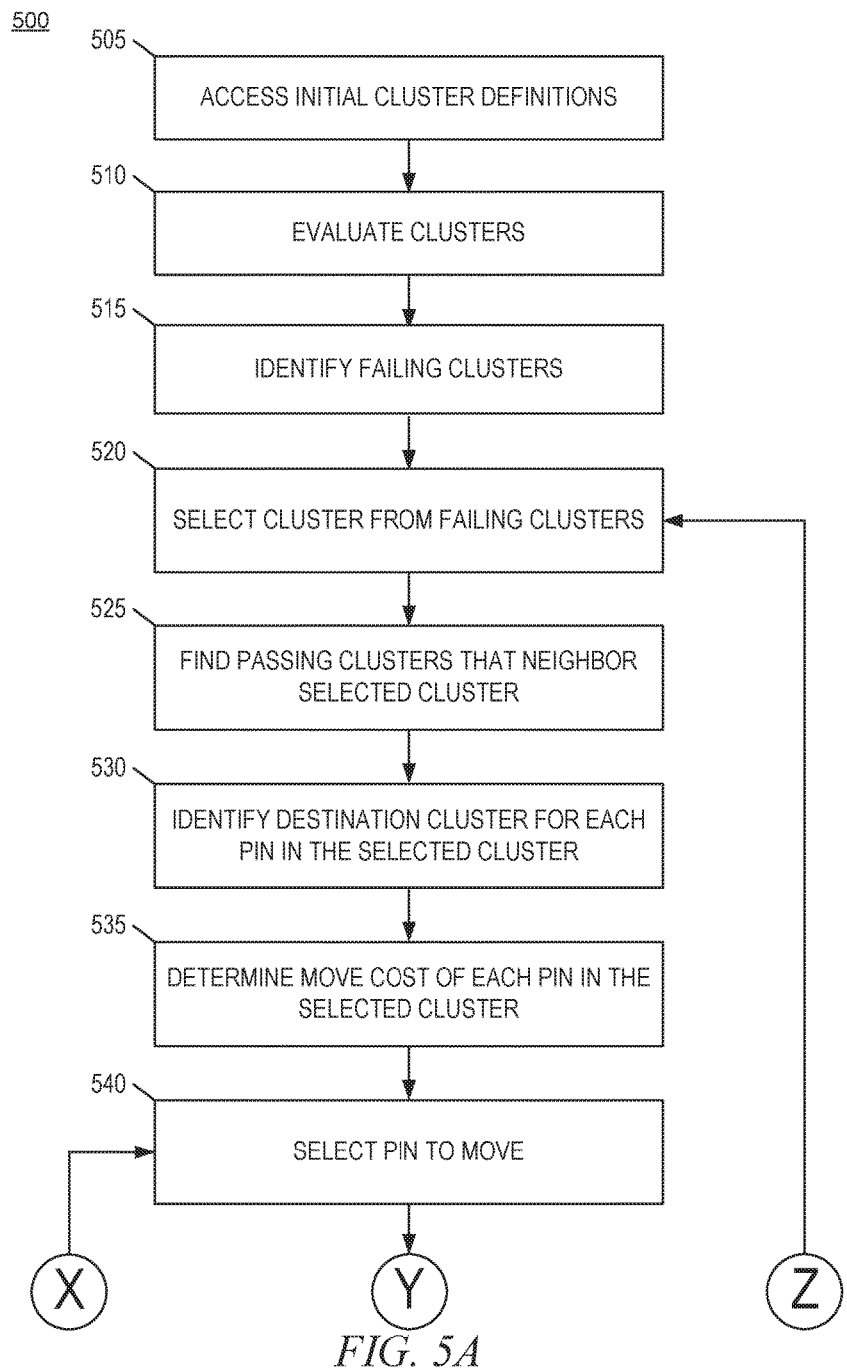
FIGS. 5A and 5B are a flowchart illustrating operations of the CTS tool in performing a method for pin move refinement, according to some example embodiments.
Figure 5B:
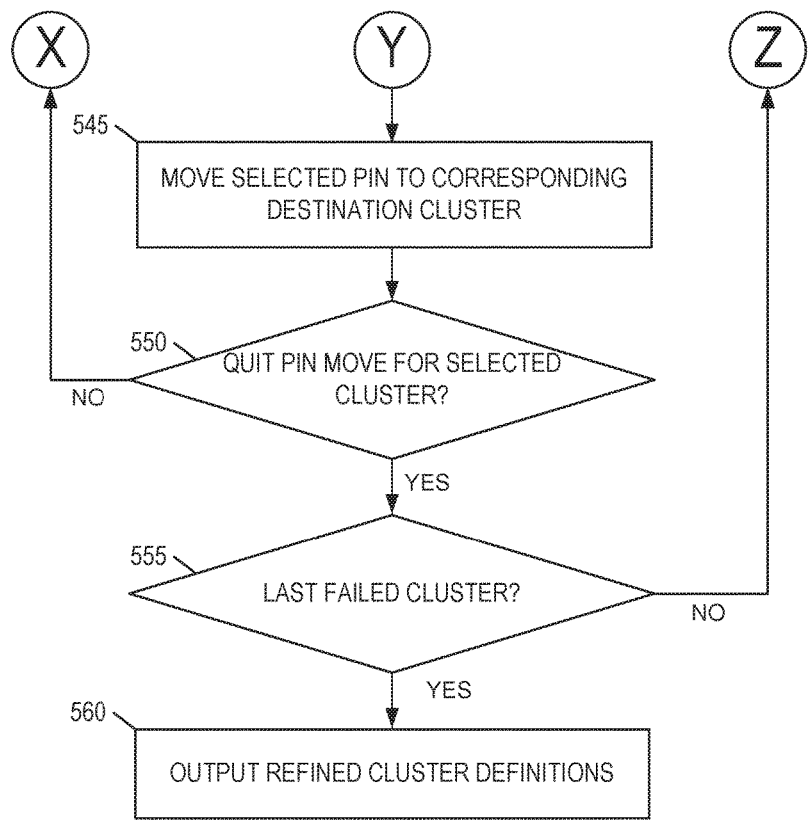

FIGS. 5A and 5B are a flowchart illustrating operations of the CTS tool in performing a method 500 for pin move refinement, according to some example embodiments. The method 500 may be embodied in computer-readable instructions for execution by one or more processors such that the operations of the method 500 may be performed in part or in whole by a computing device (e.g., the machine 700 of FIG. 7). Such an embodiment may include software executed on an EDA computing device that includes a CTS tool configured to generate and refine a clock tree structure; accordingly, the method 500 is described below by way of example with reference thereto. However, it shall be appreciated that the performance of the method 500 is not intended to be limited to such hardware configurations, and at least some of the operations of the method 500 may be deployed on various other hardware configurations. For example, some embodiments comprise a device that includes a memory with a circuit design, and processing circuitry configured into a special device to perform the operations of the method 500.

At operation 505, the CTS tool accesses initial cluster definitions included as part of an initial clustering solution for an IC design. The initial cluster definitions define an initial set of clusters, each of which includes a group of pins. The pins may, for example, correspond to input pins of flops or IP blocks for lowest-level (e.g., leaf-level) clustering, or input pins of clock drivers or clock gates for higher levels of clustering.

The CTS tool, at operation 510, evaluates each of the clusters with respect to one or more design rule constraints for the IC design. The one or more design rule constraints may include targets for timing characteristics of the clusters, including slew and skew in addition to loading characteristics of the clusters (e.g., based on a total capacitance of the clusters). Accordingly, in evaluating a cluster, the CTS tool assesses the timing and loading characteristics of the cluster. For example, the CTS tool may analyze each cluster to determine the slew of each cluster and compare the slew of each cluster to a target slew imposed by the design rule constraints. In another example, the CTS tool may analyze each cluster to determine the skew of each cluster and compare the skew of each cluster to a target skew imposed by the design rule constraints. The CTS tool may further compare the results of the assessment of the timing and loading characteristics with the timing and loading target values imposed by the design rule constraints.

The CTS tool may further classify each cluster according to a status of the cluster in satisfying the one or more design rule constraints determined based on the comparison of the timing and loading characteristics with the timing and loading targets imposed by the design rule constraints. For example, clusters that do not meet the timing and loading targets imposed by the design rule constraints (e.g., clusters that violate design rule constraints) are classified by the CTS tool as "failing" clusters. Clusters that meet the timing and loading targets imposed by the design rule constraints by more than a predefined margin are classified by the CTS tool as "passing" clusters. Passing clusters that meet the timing and loading targets imposed by the design rule constraints, but only by a small predefined margin (e.g., 5%), are classified by the CTS tool as "borderline passing." Alternatively, borderline passing clusters may be considered or classified as "nearly failing" clusters, as these clusters are also close to violating design rule constraints because they barely satisfy the design rule constraints. Hence, the CTS tool assigns a classification to each cluster based on a status of the cluster in satisfying the timing and loading targets imposed by the design rule constraints.

At operation 515, the CTS tool identifies one or more failing clusters from the initial cluster definitions based on the evaluation of the clusters with respect to the one or more design rule constraints for the IC design. As noted above, a failing cluster fails to satisfy timing and/or loading targets imposed by design rule constraints. In other words, failing clusters are clusters that violate design rule constraints. In some embodiments, the identifying of the failing clusters may be based on the classifications assigned to each cluster.

The CTS tool, at operation 520, selects, from the identified failing clusters, a cluster for pin move refinement. As shown, a different failing cluster is selected at each iteration of the method 500, such that pin move refinement is performed for each failing cluster. The CTS tool may select the cluster on the basis of the severity of the failure of the cluster to meet the targets imposed by design rule constraints. For example, the CTS tool may rank the identified failing clusters based on the severity of the failure of each cluster to meet the targets, and the CTS tool may select the failing cluster with the highest rank.

At operation 525, the CTS tool finds passing clusters (e.g., clusters that meet the targets imposed by the design rule constraints by more than a predefined margin) that are nearest neighbors to the selected cluster. In other words, the CTS tool identifies passing clusters that are the closest passing clusters to the selected cluster of all clusters in the current iteration of the method 500. In an example, the CTS tool may determine the centroid location for each passing cluster in the current iteration of the method 500 (e.g., the centroid location for a cluster may be computed from the locations of the pins associated with the cluster) and identify the passing clusters with centroid locations that are below a predefined distance value from the selected cluster as the nearest neighbors to the selected cluster.

For each pin in the selected cluster, the CTS tool identifies a destination cluster from the neighboring passing clusters, at operation 530. The destination cluster is the cluster to which the corresponding pin is to be moved. The CTS tool may determine a destination cluster for a pin based on a distance of the pin from the neighboring passing clusters. For example, the CTS tool may identify the passing cluster that is nearest to a pin as the destination cluster for the pin.

At operation 535, the CTS tool determines a move cost associated with each pin in the selected cluster. The move cost associated with a pin may be based on a distance of the pin from the corresponding destination cluster or a distance of the pin from a center (e.g., center of mass) of the selected cluster. Accordingly, in determining the move cost associated with a pin in the selected cluster, the CTS tool may determine at least one of the distance of the pin from the destination cluster, or the distance of the pin from a center of the selected cluster.

As shown, the CTS tool selects (at operation 540) a pin from the selected cluster to move to its corresponding destination cluster. The CTS tool may select the pin on the basis of move cost. Accordingly, the CTS tool may rank the pins that form the selected cluster according to move cost, and select the pin with the lowest rank (e.g., the pin with the lowest move cost).

At operation 545, the CTS tool moves the selected pin from the selected cluster to the corresponding destination cluster (determined at operation 530). Rather than moving the actual position of the selected pin, the CTS tool alters the boundary of the selected cluster such that the selected pin is excluded from the selected cluster, and alters the boundary of the destination cluster such that the destination cluster includes the selected pin.

The CTS tool continues to iteratively move pins from the selected cluster to their corresponding destination clusters until the CTS tool determines, at operation 550, (e.g., through reevaluation) that the selected cluster is passing (or borderline passing) or if none of the destination clusters for the remaining pins in the selected cluster can include a pin without violating one or more of the design rule constraints. In other words, the CTS tool moves pins from the selected cluster to neighboring passing clusters until the selected cluster meets the timing and loading targets or if there are no available destination clusters that can still meet the timing and loading targets imposed by the design rule constraints of the IC design after including a pin from the selected cluster.

Further, as shown, the CTS tool iteratively performs operations 520-550 until each of the identified failing clusters has been refined to meet the timing and loading targets imposed by the design rule constraints of the IC design or until the clusters can no longer be refined on account of unavailable destination clusters that are the nearest neighbors of the identified failing clusters. Upon determining that the last failing cluster from the initial cluster definitions has been refined (at operation 555), the method 500 proceeds to operation 560, where the CTS tool outputs refined cluster definitions that define the grouping of pins according to the refined clusters resulting from the forgoing iterative pin move refinement process. In outputting the cluster definitions, the CTS tool may supply the cluster definitions in an appropriate file format to one or more internal or external systems, or the CTS tool may store the cluster definitions in a database, in memory, or on disk for subsequent use in one or more processes.

Figure 6A:
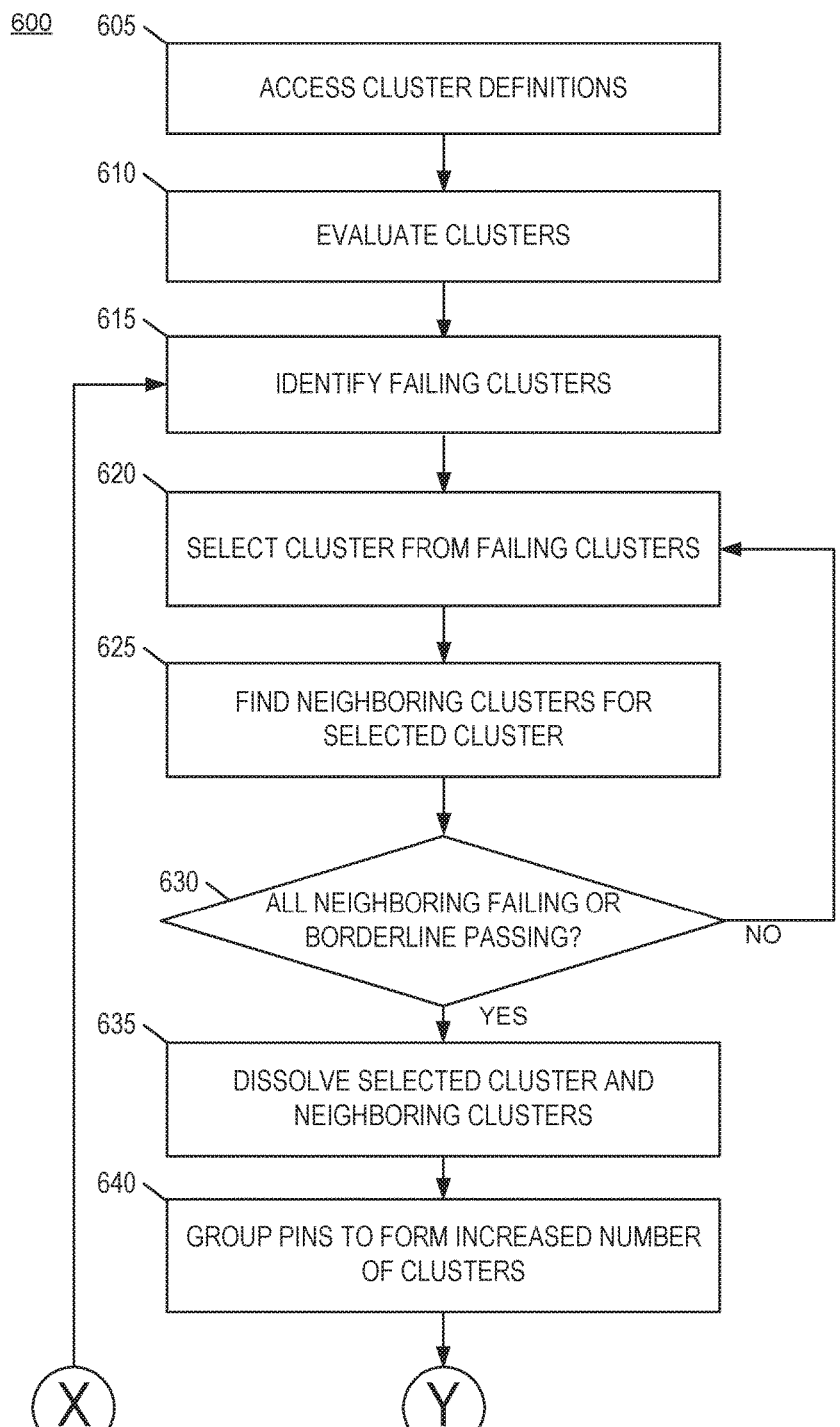
FIGS. 6A and 6B are a flowchart illustrating operations of the CTS tool in performing a method for local reclustering, according to some example embodiments.
Figure 6B:
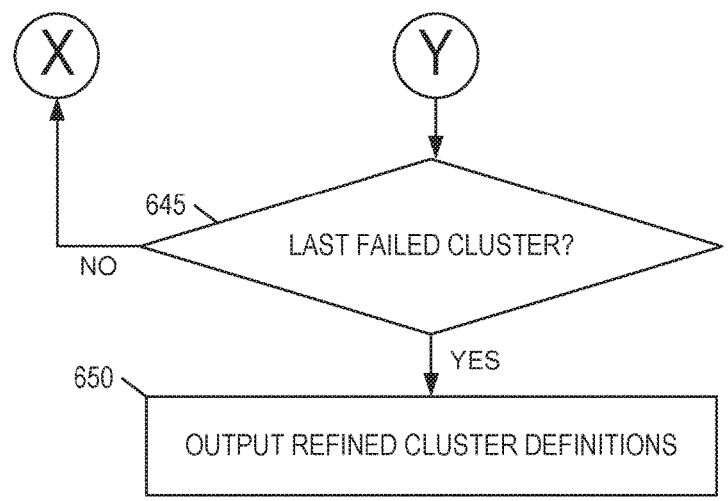

FIGS. 6A and 6B are a flowchart illustrating operations of the CTS tool in performing a method 600 for local reclustering, according to some example embodiments. Consistent with some embodiments, the method 600 may be performed subsequently to the method 500, as described above in reference to FIG. 2. However, in other embodiments, the method 600 may be performed independently of the method 500.

Figure 7:
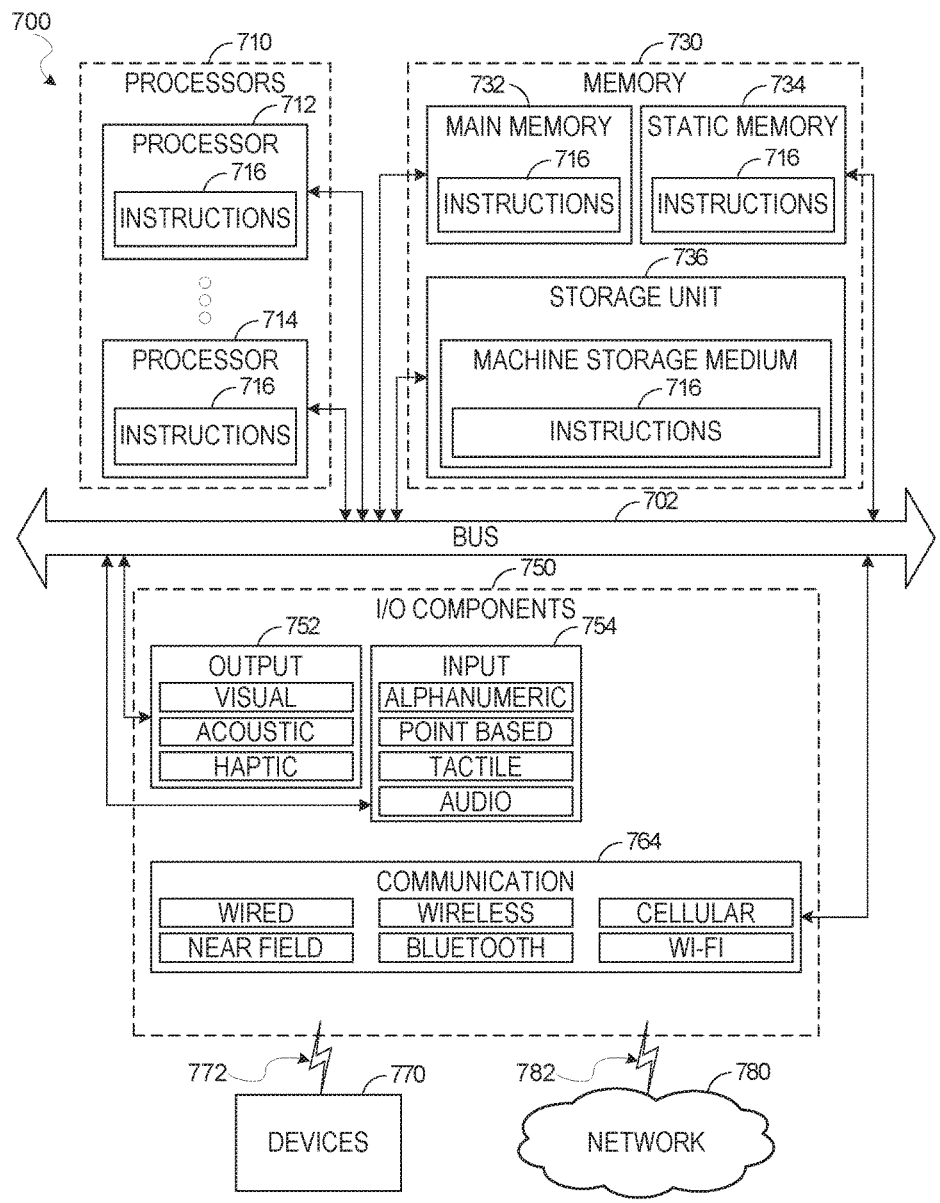
FIG. 7 is a diagrammatic representation of a machine in the example form of a computer system within which a set of instructions for causing the machine to perform any one or more of the methodologies discussed herein may be stored and executed.

The method 600 may be embodied in computer-readable instructions for execution by one or more processors such that the operations of the method 600 may be performed in part or in whole by a computing device (e.g., the machine 700 of FIG. 7). Such an embodiment may include software executed on an EDA computing device that includes a CTS tool configured to generate and refine a clock tree structure, accordingly, the method 600 is described below by way of example with reference thereto. However, it shall be appreciated that the performance of the method 600 is not intended to be limited to such hardware configurations, and at least some of the operations of the method 600 may be deployed on various other hardware configurations. For example, some embodiments comprise a device that includes a memory with a circuit design, and processing circuitry configured into a special device to perform the operations of the method 600.

At operation 605, the CTS tool accesses cluster definitions included as part of a clustering solution for an IC design. The cluster definitions define a set of clusters, each of which includes a group of pins. The pins may, for example, correspond to input pins of flops or IP blocks for lowest-level (e.g., leaf-level) clustering, or input pins of clock drivers or clock gates for higher levels of clustering. Depending on the embodiment, the cluster definitions may be part of an initial clustering solution or may be part of a refined clustering solution such as the refined cluster definitions produced as a result of performance of the method 500.

The CTS tool, at operation 610, evaluates each of the clusters with respect to one or more design rule constraints for the IC design. As noted above, the one or more design rule constraints may include targets for timing characteristics of the clusters, including slew and skew in addition to loading characteristics of the clusters (e.g., based on a total capacitance of the clusters). Accordingly, as described above, in evaluating a cluster, the CTS tool assesses the timing and loading characteristics of the cluster. The CTS tool may further compare the results of the assessment of the timing and loading characteristics with the timing and loading target values imposed by the design rule constraints. As part of the evaluating of the clusters, the CTS tool classifies each cluster in the manner set forth above with respect to the method 500 (e.g., as failing, borderline passing, or passing).

At operation 615, the CTS tool identifies one or more failing clusters from the cluster definitions based on the evaluation of the clusters with respect to the one or more design rule constraints for the IC design. In some embodiments, the identifying of the failing clusters may be based on the classifications assigned to each cluster.

The CTS tool, at operation 620, selects, from the identified failing clusters, a cluster to be the target of local reclustering. The CTS tool may select the cluster on the basis of the severity of the failure of the cluster to satisfy the targets imposed by design rule constraints (e.g., how much the timing or loading characteristics of the clusters fall below or exceed timing and loading targets). For example, the CTS tool may rank the identified failing clusters based on the severity of the failure of the cluster to satisfy the targets, and the CTS tool may select the failing cluster with the highest rank.

At operation 625, the CTS tool finds the nearest neighbor clusters to the selected cluster. In an example, the CTS tool may determine the centroid location for each cluster in the current iteration of the method 600 (e.g., the centroid location for a cluster may be computed from the locations of the pins associated with the cluster) and identify clusters with centroid locations that are below a predefined distance value from the selected cluster as the nearest neighbors to the selected cluster.

At operation 630, the CTS tool determines whether each of the identified nearest neighboring clusters is either failing or borderline passing (or nearly failing). If the CTS tool determines that at least one of the neighboring clusters is a passing cluster, the method 600 returns to operation 620, where the CTS tool selects a different failing cluster. Otherwise, the method 600 proceeds to operation 635, where the CTS tool dissolves the selected cluster and each of the neighboring clusters. In dissolving the clusters, the CTS tool ungroups the pins that form the clusters, thereby resulting in a set of unclustered pins (e.g., pins that do not belong to a cluster).

Consistent with some embodiments, upon determining that each of the identified neighboring clusters is classified as either failing or borderline passing, the CTS tool may create a recluster list (or equivalent data structure) comprising the neighboring clusters along with the selected cluster. In these embodiments, the CTS tool may dissolve each cluster included in the recluster list.

The CTS tool, at operation 640, regroups the unclustered pins to form a new set of clusters that has one or more additional clusters. In other words, let K represent the number of clusters in the set comprising the selected cluster and the neighboring clusters; then in regrouping the unclustered pins, the CTS tool forms at least K+1 clusters. In grouping the pins to form the new set of clusters, the CTS tool may recursively group the pins to form the K+1 or more clusters. The CTS tool may apply one of many known algorithms to form clusters. For example, the CTS tool may group pins based on a metric for proximity (e.g., Manhattan distance between sinks) subject to target loading constraints.

As shown, the CTS tool may iteratively perform operations 615-640 until each of the identified failing clusters has been processed (e.g., locally reclustered). With each iteration, new sets of passing clusters are formed from dissolved failing clusters. As such, with each iteration of the method 600, the CTS tool returns to operation 615 to identify the remaining failed clusters, which are then processed in accordance with the description provided above. Upon determining that the last failing cluster has been processed (at operation 645), the method 600 proceeds to operation 650, where the CTS tool outputs refined cluster definitions that define the grouping of pins according to the iterative local reclustering process. In outputting the cluster definitions, the CTS tool may supply the cluster definitions in an appropriate file format to one or more internal or external systems, or the CTS tool may store the cluster definitions in a database, in memory, or on disk for subsequent use in one or more processes.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute methods 200, 500, and 600. Additionally, or alternatively, the instructions 716 may implement the design flow 100 of FIG. 1. The instructions 716 transform the general, non-programmed machine 700 into a particular machine 700 programmed to carry out the described and illustrated functions in the manner described here. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities (e.g., near field, Bluetooth, and Wi-Fi). The devices 770 may be another machine or any of a wide variety of peripheral devices (e.g., a peripheral device coupled via a universal serial bus (USB)).

Executable Instructions and Machine Storage Medium

The various memories (e.g., 730, 732, 734, and/or the memory of the processor(s) 710) and/or the storage unit 736 may store one or more sets of instructions and data structures (e.g., software) embodying or utilized by any one or more of the methodologies or functions described herein. These instructions, when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
one or more processors of a machine; and
a computer storage medium storing instructions, which when executed by the one or more processors, configure the machine to perform operations comprising:
accessing initial cluster definitions for an integrated circuit design, the initial cluster definitions defining a plurality of clusters, each cluster including a plurality of pins;
evaluating each cluster in the plurality of clusters with respect to one or more design rule constraints;
identifying, from the plurality of clusters defined by the initial cluster definitions, a failing cluster based on a

15 result of the evaluating, the failing cluster failing to satisfy the one or more design rule constraints;

identifying, from the plurality of clusters defined by the initial cluster definitions, nearest neighboring clusters to the failing cluster that satisfy the one or more design rule constraints;

moving one or more pins from the failing cluster to a destination cluster selected from the nearest neighboring clusters, the moving of the one or more pins from the failing cluster to the destination cluster yielding refined cluster definitions; and generating an integrated circuit layout instance based on the refined cluster definitions, the integrated circuit layout instance being usable to fabricate an integrated circuit based on the integrated circuit design.

2. The system of claim 1, wherein the operations further comprise:

determining a move cost of each pin in the failing cluster; and selecting the one or more pins in the failing cluster to be moved to the destination cluster based on the move cost of the one or more pins.

3. The system of claim 2, wherein determining the move cost of a pin comprises at least one of:

determining a distance of the pin from the destination cluster; or determining a distance of the pin from a center of the failing cluster.

4. The system of claim 1, wherein the evaluating of each cluster comprises:

determining timing characteristics of each cluster; and comparing the timing characteristics of each cluster with timing targets imposed by the one or more design rule constraints.

5. The system of claim 1, wherein the evaluating of each cluster comprises classifying each cluster according to a status of the cluster in satisfying the one or more design rule constraints, the status being selected from a group comprising:

failing, borderline passing, and passing.

6. The system of claim 1, wherein the operations further comprise selecting the destination cluster from the nearest neighboring clusters based on a distance of the one or more pins from each of the nearest neighboring clusters, the destination cluster being included in the plurality of clusters defined by the initial cluster definitions.

7. The system of claim 1, wherein the identifying of the nearest neighboring clusters to the failing cluster that satisfy the one or more design rule constraints comprises:

determining a centroid location for each cluster in the plurality of clusters; and identifying a subset of the plurality of clusters having centroid locations below a predefined distance from the failing cluster as the nearest neighbors to the failing cluster.

8. The system of claim 1, wherein the operations further comprise:

identifying an additional failing cluster; and moving one or more pins from the additional failing cluster to another cluster that neighbors the additional failing cluster and satisfies the one or more design rule constraints.

9. The system of claim 1, wherein the operations further comprise:

determining, based on the refined cluster definitions, that a cluster violates the one or more design rule constraints; and

16 in response to determining that the cluster violates the one or more design rule constraints, performing local reclustering on the cluster.

10. The system of claim 9, wherein performing the local reclustering on the cluster comprises:

identifying a set of clusters that neighbor the cluster;

dissolving the cluster and the set of clusters that neighbor the cluster, the dissolving of the cluster and the set of clusters that neighbor the cluster resulting in a plurality of unclustered pins; and regrouping the plurality of unclustered pins to form a set of new clusters.

11. The system of claim 10, further comprising:

creating a recluster set comprising the cluster and the set of clusters that neighbor the cluster;

wherein the set of new clusters includes an additional number of clusters compared to the recluster set.

12. The system of claim 10, wherein the performing of the local reclustering on the cluster further comprises:

determining that each cluster in the set of clusters that neighbor the cluster fails or nearly fails to satisfy the one or more design rule constraints, wherein the dissolving of the cluster and the set of clusters is in response to determining that each cluster in the set of clusters that neighbor the cluster fails or nearly fails to satisfy the one or more design rule constraints.

13. A method comprising:

accessing, from a computer-readable memory, a database to obtain initial cluster definitions for an integrated circuit design, the initial cluster definitions defining a plurality of clusters, each cluster including a plurality of pins;

evaluating, using one or more processors, each cluster with respect to one or more design rule constraints;

identifying, using the one or more processors, a failing cluster from the plurality of clusters based on a result of the evaluating, the failing cluster failing to satisfy the one or more design rule constraints;

finding, from the plurality of clusters defined by the initial cluster definitions, using the one or more processors, neighboring clusters near the failing cluster that satisfy the one or more design rule constraints;

determining, using the one or more processors, a move cost of each pin in the failing cluster;

moving a pin from the failing cluster to a destination cluster based on the move cost of the pin, the destination cluster being selected from the neighboring clusters based on a distance of the destination cluster from the pin, the moving of the pin from the failing cluster to the destination cluster yielding refined cluster definitions; and generating an integrated circuit layout instance based on the refined cluster definitions, the integrated circuit layout instance being usable to fabricate an integrated circuit based on the integrated circuit design.

14. The method of claim 13, wherein determining the move cost of the pin comprises at least one of:

determining a distance of the pin from the destination cluster; or determining a distance of the pin from a center of the failing cluster.

15. The method of claim 13, wherein the evaluating of each cluster comprises:

determining timing and loading characteristics of each cluster; and comparing the timing and loading characteristics of each cluster to one or more timing or loading targets imposed by the one or more design rule constraints.

16. The method of claim 13, wherein the finding of the neighboring clusters near the failing cluster that satisfy the one or more design rule constraints comprises:
   determining a centroid location for each cluster in the plurality of clusters; and
   identifying a subset of the plurality of clusters having centroid locations below a predefined distance from the failing cluster as the nearest neighbors to the failing cluster.

17. The method of claim 13, further comprising:
   determining, based on the refined cluster definitions, that a cluster violates the one or more design rule constraints; and
   in response to determining that the cluster violates the one or more design rule constraints, performing local reclustering on the cluster.

18. The method of claim 17, wherein performing the local reclustering on the cluster comprises:
   identifying a set of clusters that neighbor the cluster;
   dissolving the cluster and the set of clusters that neighbor the cluster, the dissolving of the cluster and the set of clusters that neighbor the cluster resulting in a plurality of unclustered pins; and
   regrouping the plurality of unclustered pins to form a set of new clusters.

19. A system comprising:
   one or more processors of a machine; and
   a computer storage medium storing instructions, which when executed by the machine, cause the machine to perform operations comprising:
   accessing cluster definitions that define a plurality of clusters, each cluster including a plurality of pins;
   evaluating each cluster with respect to one or more design rule constraints;
   identifying, based on the evaluation, a first cluster that fails to satisfy the one or more design rule constraints;
   identifying nearest neighboring clusters to the first cluster based on a distance between the first cluster and each cluster in the plurality of clusters;
   determining that each of the nearest neighboring clusters individually fails or nearly fails to satisfy the one or more design rule constraints;
   based on determining that each of the nearest neighboring clusters individually fails or nearly fails to satisfy the one or more design rule constraints, dissolving the first cluster and the nearest neighboring clusters, the dissolving of the first cluster and the nearest neighboring clusters resulting in unclustered pins;
   regrouping the unclustered pins to form a new set of clusters; and
   generating an integrated circuit layout instance based on the refined cluster definitions, the integrated circuit layout instance being usable to fabricate an integrated circuit based on the integrated circuit design, the refined cluster definitions including the new set of clusters.

20. The system of claim 19, wherein the operations further comprise:
   identifying, based on the evaluating, a second cluster that fails to satisfy the one or more design rule constraints; and
   moving a pin from the second cluster to a third cluster based on determining that the third cluster satisfies the one or more design rule constraints, the third cluster being a nearest neighbor to the second cluster.

* * * * *